United States Patent
Morales et al.

(10) Patent No.: US 7,090,404 B2
(45) Date of Patent: Aug. 15, 2006

(54) ROLLING ELEMENT BEARING FOR ULTRA-LOW VISCOSITY FLUIDS

(75) Inventors: Espejel Guillermo Morales, Huizen (NL); Antonio Gabelli, Ijsselstein (NL); Pieter Martin Lugt, Vianen (NL)

(73) Assignee: AB SKF, Gothenburg (SE)

( * ) Notice: Subject to any disclaimer, the term of this patent is extended or adjusted under 35 U.S.C. 154(b) by 158 days.

(21) Appl. No.: 10/479,237

(22) PCT Filed: May 31, 2002

(86) PCT No.: PCT/NL02/00352

§ 371 (c)(1),
(2), (4) Date: May 7, 2004

(87) PCT Pub. No.: WO02/097289

PCT Pub. Date: Dec. 5, 2002

(65) Prior Publication Data

US 2004/0184687 A1    Sep. 23, 2004

(30) Foreign Application Priority Data

May 31, 2001   (NL) .................................. 1018190

(51) Int. Cl.
*F16C 19/00*    (2006.01)

(52) U.S. Cl. ...................................... 384/464; 384/450

(58) Field of Classification Search ................ 384/450, 384/462, 464
See application file for complete search history.

(56) References Cited

U.S. PATENT DOCUMENTS 3,695,391 A * 10/1972 Munnich et al. ............ 184/109
5,469,713 A    11/1995 Wardle et al.
6,176,092 B1    1/2001 Vandeleest et al.

OTHER PUBLICATIONS

Patent Abstracts of Japan, vol. 017, No. 151 (M-1387), Mar. 25, 1993 & JP 04 321816 A (NTN Corp), Nov. 11, 1992, abstract.

* cited by examiner

*Primary Examiner*—Thomas R. Hannon
(74) *Attorney, Agent, or Firm*—Young & Thompson (57) ABSTRACT

A rolling element having comprises an inner ring, an outer ring and a series of rolling elements which are in contact with the raceways of the rings, an ultra-low viscosity fluid being present in the contacts having a kinematic viscosity $v=(\eta_o/\rho)$ of less than 2 mm²/s, wherein the surfaces of the rings and the rolling elements have asperities which can have solid-to-solid contact during operation of the bearing. A factor $D_q$ is defined which is equal to (I) whereby the solid-to-solid contact of the asperities is reduced by selecting such design parameters and operating conditions of the bearing that $D_q$ is in the range from $8.0 \times 10^{-6}$ mrad s$^{1/2}$ to $1.36 \times 10^{-4}$ mrad s$^{1/2}$.

11 Claims, 6 Drawing Sheets

ROLLING ELEMENT BEARING FOR ULTRA-LOW VISCOSITY FLUIDS

The invention is related to a rolling element bearing, comprising an inner ring, an outer ring and a series of rolling elements which are in contact with the raceways of said rings, an ultra-low viscosity fluid being present in said contacts having a kinematic viscosity $v=(\eta_o/\rho)$ of less than 2 mm$^2$/s wherein the surfaces of the rings and the rolling elements have asperities which can have solid-to-solid contact during operation of the bearing.

Such a bearing is disclosed in U-B1-6,176,092. It is carried out as a hybrid bearing having ceramic rolling elements and steel rings. The bearing in question is applied in a chiller, which means that an ultra-low viscosity pure refrigerant is used as lubricant. Although such ultra-low viscosity refrigerants are only able to provide a relatively thin film under rolling action, nevertheless an acceptable service life of the bearing in question can be obtained.

This is to be attributed to the fact that the contacts between the surface asperities of the rolling elements and the rings do not lead to welding phenomena as could be the case in all steel bearings. Despite the fact that contacts do occur between the rolling elements and rings, welding is avoided as a result of the fact that the rolling elements consist of a ceramic material.

Ultra-low viscosity fluids (ULVF) used in rolling element bearings are defined as hydrocarbon-derived compounds with kinematic viscosity lower than, about 2 mm2/s (at room temperature, see Table 1). There are many industrial applications that involve transportation, processing or use of these fluids in a mechanical system. Due to the very low viscosity of these fluids, total separation of ultra-low viscosity fluids from the lubrication system is not possible using to day sealing technology. This leads to ultra-low viscosity fluids pollution of the bearing lubricant, causing reduction of the oil film and increased direct metal-to-metal contact in the rolling contact. This condition leads to a dramatic shortening of the life of the rolling element bearing. Typically a factor 10 to 100 in life reduction can be expected for these operating conditions. Today this problem is not solved in a satisfactory way. Present solutions have attempted, in various ways, to limit as much as possible the presence of ultra-low viscosity fluids in the bearing space in order to reduce the surface distress associated with mix lubrication operating conditions caused by the presence of ultra-low viscosity fluids in the bearing, thus allowing the bearing to reach a minimum level of life expectancy. However in general this type of design increases the complexity and cost of the machine and reduces its efficiency. During the years other ideas were attempted to try to extend the life and reliability of a mechanical system working in combination with ultra-low viscosity fluids. This includes the use of hydrostatic supported journal bearings or use of standard hybrid bearings.

Nevertheless, it appears that still no general practical solution exists which provides a significant extension of the service life and an acceptable reliability of rolling element bearings which operate in ultra-low viscosity fluid lubrication conditions. Examples of such ultra-low viscosity fluids are shown in Table 1.

TABLE 1

Typically Ultra-low viscosity fluids.

| Fluid (liquid) | Temperature, ° C. | Kinematic Viscosity, mm$^2$/s $v = \eta_o/\rho$ | Pressure-viscosity coefficient l/GPa $\alpha$ |
|---|---|---|---|
| diesel | 25 | 1.82–3.75 | 8.0–10.1 |
| gasoline | 25 | 0.46–0.55 | 6.3–7.1 |
| ethanol | 25 | 1.4 | 6.6 |
| methanol | 25 | 0.69 | 4.8 |
| toluene | 25 | 0.56 | 6.2 |
| decane | 25 | 1.01 | 10.6 |
| R134a | 40 | 0.15 | 14.2 |
| R124 | 40 | 0.17 | 15 |

Traditionally, it is attempted to prevent solid-to-solid contact of the surface asperities by ascertaining a certain level of separation between these surfaces. This separation depends on the ratio $\lambda$ of the lubricant film thickness over the average roughness $R_q$. For instance, it is generally accepted that for $\lambda \leq 1$ a great amount of surface contact occurs, whereas for $\lambda \geq 4$ no surface contacts at all occur.

However, it has become clear that quantifying the separation between the surfaces by means of $\lambda$ does not lead to a proper description of ultra-low viscosity fluid lubricated bearings. This is due to the fact that according to this traditional approach of the phenomena which occur in a rolling contact bearing, no account is taken of the fact that elastic deformations occur during over-rolling in the Hertzian contact. In particular, the fact is overlooked that as a result of asperities deformation, the actual roughness heights in the rolling contact are reduced significantly, which leads to a better separation.

The object of the invention is to provide a rolling element bearing of the type described before, which allows a better and more reliable service even under ultra-low viscosity fluid lubrication, e.g. as occur in the presence of pure refrigerant. This object is achieved in that a factor $D_q$ is defined which is equal to $$\Delta_q \sqrt{\eta_o \alpha}$$

wherein $\Delta_q$=mean slope of the roughness, $\eta_o$=dynamic viscosity at saturation conditions, $\alpha$=pressure-viscosity coefficient, and in that the solid-to-solid contact of the asperities is reduced by selecting such design parameters and operating conditions of the bearing that $8.0 \times 10^{-6}$ mrad s$^{1/2}$ $\leq D_q \leq 1.36 \times 10^{-4}$ mrad s$^{1/2}$.

By means of the factor $D_q$ according to the invention, a range of design parameters can be selected in combination with a range of operating conditions which provide an increased separation of the contact surfaces in the rolling contacts. Thereby, a significant increase in reliability and service life expectancy of the bearings in question are obtained. This is a result of the fact that a drastic reduction of solid-to-solid contacts in the Hertzian zone is obtained. Thus, the occurrence of surface distress is greatly reduced, whereby the risk of raceway and rolling element surface damage is reduced as well.

Additional features can be incorporated in the bearing according to the invention so as to cope with short periods of reduced fluid flow of the ultra-low viscosity fluid. For instance, the surfaces of the rings and/or of the rolling elements can be coated with a diamond like coating (DLC), or the surfaces of the rings and/or of the rolling elements are coated with an anti-corrosion material. The surfaces in question could be of zinc or stainless steel.

Preferably, surfaces of the rings and/or of the rolling elements are coated with an anti-corrosion material. For instance, all rolling elements are of a ceramic material. The rolling elements are separated by a cage of a high temperature resistant material, e.g. a polymer (PEEK) or metal (brass).

The invention will now be described further with reference to an elucidation of the derivation of the factor $D_q$ shown in the figures.

Figure 1:
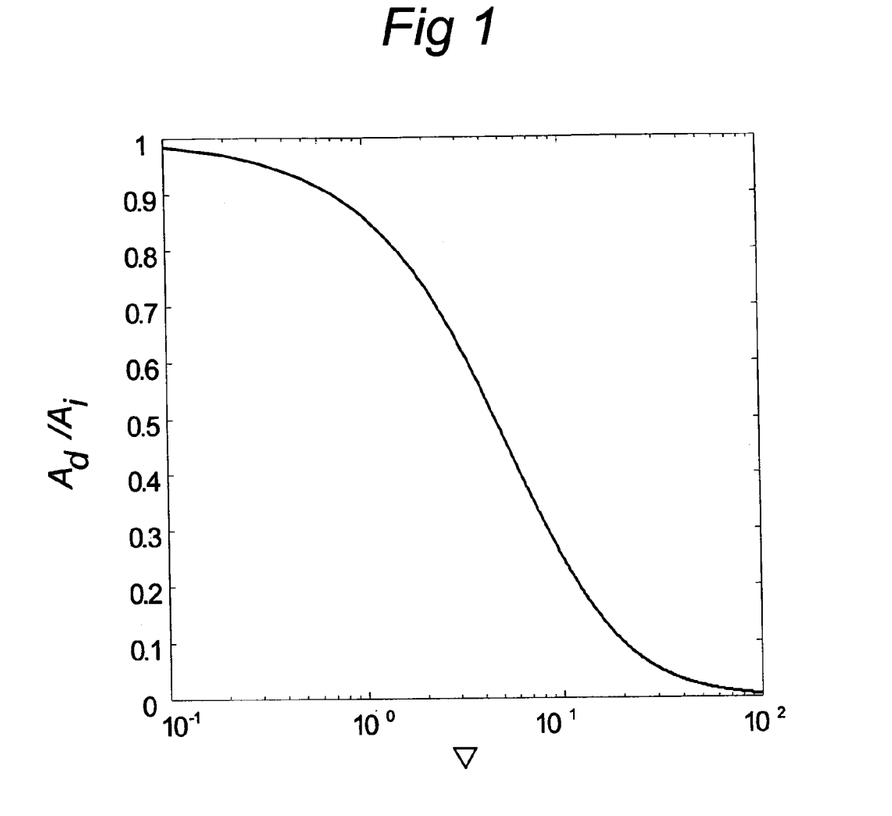
FIG. 1 shows a graph related to the amplitude reduction curve under pure rolling.

In pure rolling, a surface topography made of long wavelengths ($\omega$) components (low slopes, $\Delta_q$) together with adequate operating conditions favors elastic deformation and reduces the possibility of solid-to-solid contact, see FIG. 1.

The abscissa and the ordinate are defined as:

$$\nabla = \frac{\omega \sqrt{F}}{a\sqrt{2E'\alpha\eta_o \bar{u} R_x}} \quad (1)$$

$$\frac{A_d}{A_i} = \frac{1}{1+0.15\nabla+0.015\nabla^2} \quad (2)$$

wherein:
F=contact force,
E'=combined elasticity modulus,
α=pressure-viscosity coefficient,
ū=average velocity of the surfaces,
$R_x$=reduced radius of curvature in the contact,
$\eta_o$=dynamic viscosity at saturation conditions,
a=semi-width of the Herzian contact along the rolling direction.

Small values of $\alpha\eta_o$ increase the elastic deformation of the roughness, which favors the separation of the surfaces. However, thereby also the film thickness is reduced which possibly results in an overall reduction of the specific film thickness $\lambda=h_{min}/\sigma$. A compromise can be found by increasing the wavelength of the roughness $\omega$, so that it allows even more deformation to keep an acceptable value of $\lambda$.

In practical situations, real roughness can be regarded (using Fourier Decomposition) as the addition of many sinusoidal (or in 2-D bi-sinusoidal) waves with different amplitudes. So each component is reduced according to equation (2) with $\nabla$ given by the specific wavelength $\omega$ as pointed by equation (1). So, in fact the whole $\nabla$ spectrum is covered in real roughness.

Figure 2:
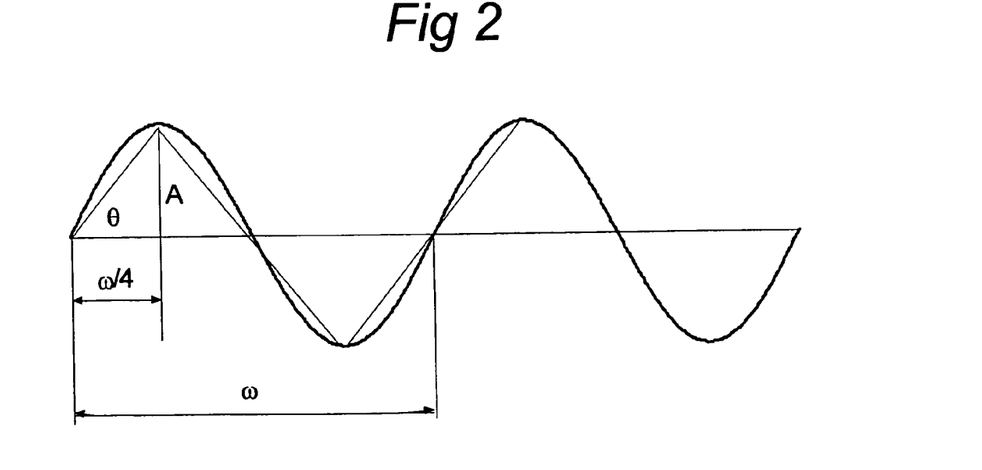
FIG. 2 shows a graph of the relationship between the roughness wavelength and slope for a sinusoidal waviness.

To understand the relationship between the representative wavelength as measured by using standard ISO parameters ($\Delta_q$, $R_q$, etcetera) in real surfaces and the representative slope of the surface, it can be assumed that the real roughness can be represented by a single sinusoidal wave z(x) of wavelength $\omega$, as shown in FIG. 2.

Therefore, $$z(x) = A\sin\left(\frac{2\pi x}{\omega}\right) \quad (3)$$

with slopes given by dz/dx, $$\tan(\theta) = \varphi = \frac{2\pi A}{\omega}\cos\left(\frac{2\pi x}{\omega}\right) \quad (4)$$

and the curvature by, $d^2z/dx^2$, $$C = \frac{4\pi^2 A}{\omega^2}\sin\left(\frac{2\pi x}{\omega}\right) \quad (5)$$

From equation (4), $$\omega = \frac{2\pi A}{\tan\theta},$$

in a real surface, A is represented by $R_q$ and tanθ is represented by $\tan\Delta_q$, therefore, $$\omega = \frac{2\pi R_q}{\tan\Delta_q} \quad (6)$$

From equation (6) it can be seen that for roughness with the same $R_q$, a lower value of $\Delta_q$ will increase the representative wavelength $\omega$, from equation (1) this increases $\nabla$ and therefore the elastic deformation of the surfaces is also increased, equation (2).

Based on this approach, an example comparison is made for a "Normal" vs. "Improved" angular contact bearing.

The internal geometry of a deep grove ball bearing (DGBB) nomination 71928 is selected, wherein the "normal" bearing (suffix 1) is an all-steel bearing with normal lubrication conditions lubricated with oil ISO 68 and the "improved" bearing (suffix 2) is a hybrid bearing (ceramic balls and steel rings) lubricated with ultra-low viscosity fluid.

The operating conditions are defined as follows:
F=530 N (heaviest loaded contact),
ū=15.43 m/s,
$R_x$=7.174 mm,
$E'_1$=226.4×10$^9$ Pa (all-steel)
$E'_2$=271.1×10$^9$ Pa (hybrid)
$a_1$=0.17 mm (all-steel)
$a_2$=−0.14 mm (hybrid),
$\Delta_{q1}$=16.11 mrad (all-steel), $\Delta_{q2}$=9.11 mrad (hybrid), both bearings with $R_q \approx 0.08 \mu m$.

The lubricant properties are defined as follows:

Oil Properties:
$\eta_o$=0.0585 Pa s,
$\alpha$=30×10$^{-9}$ Pa$^{-1}$ (oil),

Ultra-low viscosity fluid properties:
$\eta_o$=214.5×10$^{-6}$ Pa s,
$\alpha$=15×10$^{-9}$ Pa$^{-1}$ (ultra-low viscosity liquid).

Figure 3:
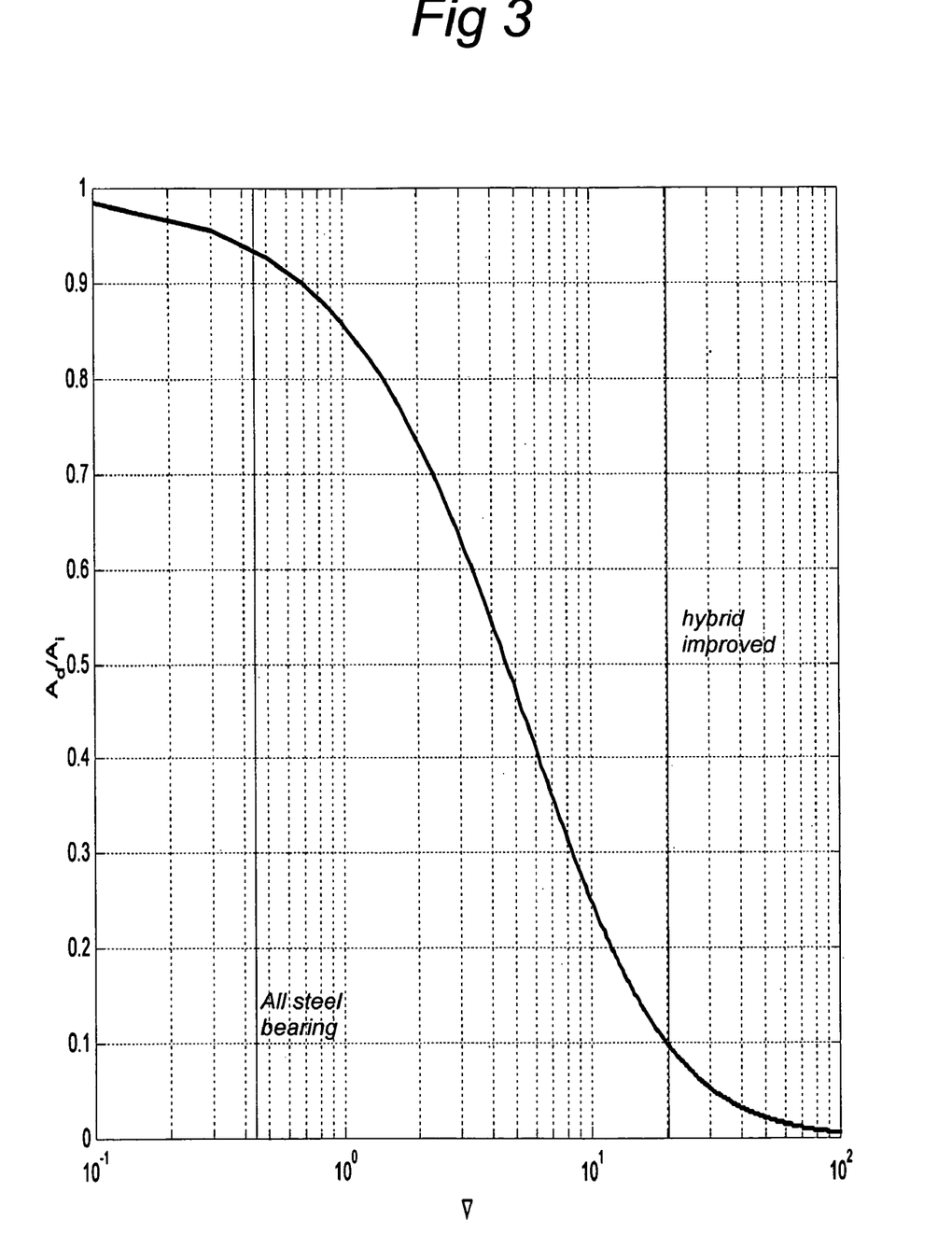
FIG. 3 shows a graph with representative $\nabla$-values for two example bearings.

For this example, FIG. 3 shows the representative values of $\nabla$ in both cases, one can see that for the hybrid bearing (improved) the elastic deformation of the roughness is larger than the all-steel bearing.

To have a clear idea of the contribution on the surface separation of this elastic deformation, the specific film thickness or $\lambda$ should be considered. The specific film thickness is defined by $\lambda = h/R_q$, where h is the chosen film thickness, for comparison reasons it can be either the minimum film thickness in the contact or the central film thickness, here the central film thickness has been used. In general, it is accepted that for $\lambda \leq 1$ there is great amount of surface contact while for $\lambda > 4$ there is no contact at all between the surface asperities.

Figure 4:
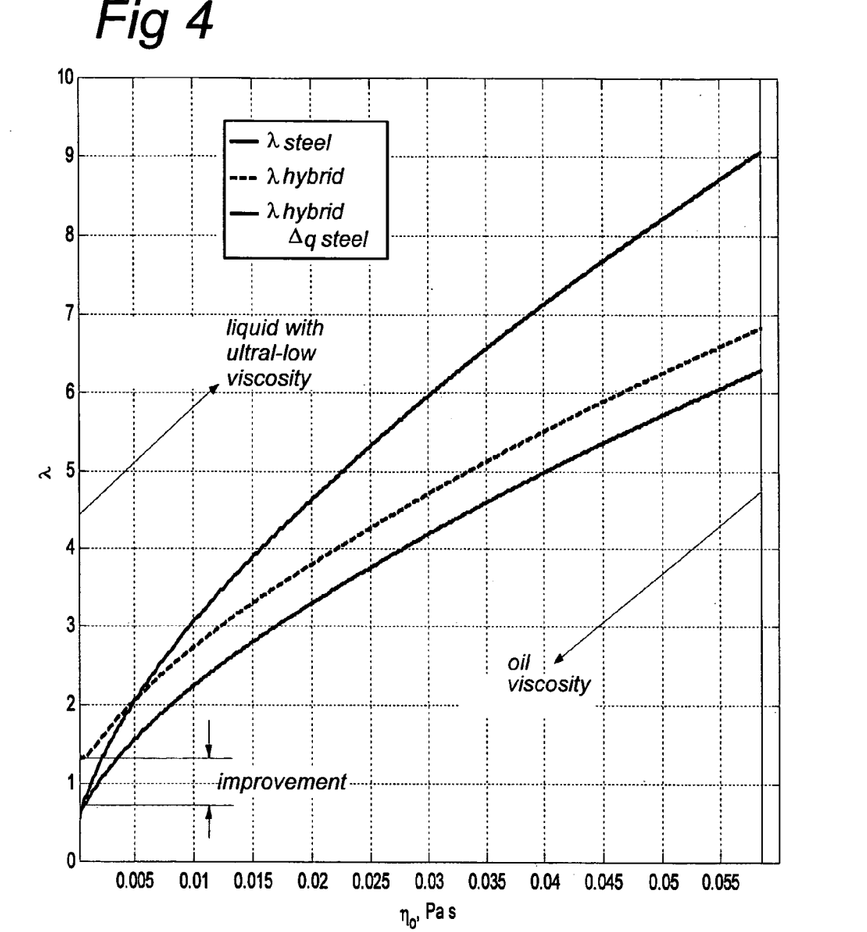
FIG. 4 shows a graph of the specific film thickness $\lambda$ as function of the lubricant viscosity $\mu_o$ of the two bearings which have been analysed, a third hypothetic bearing has been included for comparison reasons.

FIG. 4 shows the variations of $\lambda$ as a function of the viscosity of the fluid $\eta_o$ for the two bearings given in the example. For comparison, the results of a hypothetic hybrid bearing with a $\Delta_q$ value same as the "normal" all-steel bearing have been included. From this comparison, one can see the contribution to the improvement of $\lambda$ just due to the reduction of $\Delta_q$ in the improved bearing, especially in the low viscosity region.

Figure 5:
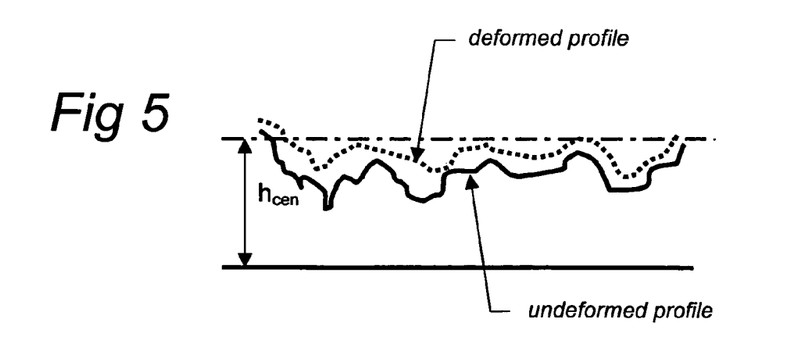
FIG. 5 shows a graph concerning the overall mechanism of roughness elastic deformation.
Figure 6:
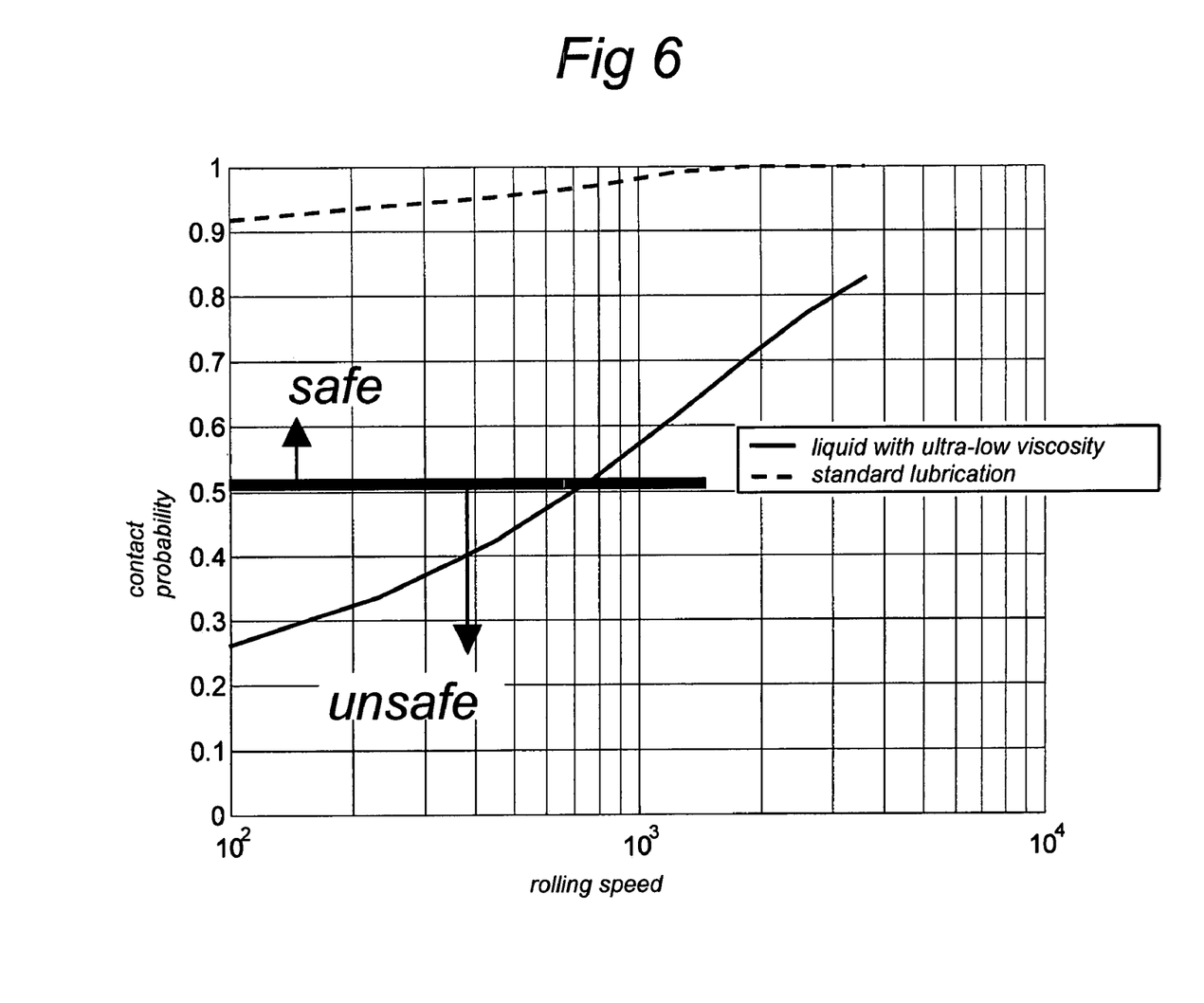
FIG. 6 shows a graph concerning the probability of no-contact as a function of the rolling velocity of the bearings.

FIG. 5 shows in schematic way the overall effect of the invention in the bearing surfaces. By calculating the "bearing area curve" of the surfaces of the two bearings, it is possible to estimate the probability of no contact (ratio of surface area with heights lower than h over surface area exceeding h). FIG. 6 shows this ratio as a function of the speed in the two bearings.

The $D_q$ Parameter will now be derived. From the above section, it is clear that the variable $\nabla$ describes the amount of elastic deformation of the roughness, equation (2). However, in a simpler case, assume two bearings with the same material and equal operating conditions but different lubricant viscosities and roughness wavelength. From equation (1), the ration of $\nabla$ can then be reduced to:

$$\frac{\nabla_1}{\nabla_2} = \frac{\omega_1 (\sqrt{\eta_o \alpha})_2}{\omega_2 (\sqrt{\eta_o \alpha})_1} \quad (7)$$

now, by substituting (6) into (7), and assuming equal $R_q$ values and only different slopes in the roughness one obtains, $$\frac{\nabla_1}{\nabla_2} = \frac{(\sqrt{\eta_o \alpha})_2 \tan\Delta_{q2}}{(\sqrt{\eta_o \alpha})_1 \tan\Delta_{q1}} \quad (8)$$

Finally, since the angle $\Delta_q$ is in general very small, so that $\tan\Delta_q \approx \Delta_q$, then $$\frac{\nabla_1}{\nabla_2} = \frac{(\sqrt{\eta_o \alpha})_2 \Delta_{q2}}{(\sqrt{\eta_o \alpha})_1 \Delta_{q1}} \quad (9)$$

From equation (9), it is clear that in this case the parameter that determines the amount of deformation in the roughness under equal operating conditions and material is only $$D_q = \Delta_q \sqrt{\eta_o \alpha} \quad (10)$$

It has been found by calculations and tests that bearings with $8.0 \times 10^{-6}$ mrad s$^{1/2} \leq D_q \leq 1.36 \times 10^{-4}$ mrad s$^{1/2}$ work well under ULVF lubrication conditions.

The following data have been used for the limits calculation:

Upper Limit:
$\Delta_q$=18.11 mrad
$\alpha$=15.0×10$^{-9}$ Pa$^{-1}$
$\eta_o$=0.0038 Pa s Lower Limit:
$\Delta_q$=9.0 mrad
$\alpha$=4.5×10$^{-9}$ Pa$^{-1}$
$\eta_o$=167.1×10$^{-6}$ Pa s Just as a reference, the oil-lubricated all-steel bearing in the example has $D_q$=6,75×10$^{-4}$ mrad s$^{1/2}$ while the hybrid "improved" bearing of the same example has $D_q$=1.63×10$^{-5}$ mrad s$^{1/2}$.

The variable $\nabla$ as a function of $D_q$ can be written as:

$$\nabla = \frac{C}{D_q} \quad (11)$$

where, $C = \frac{2\pi R_q \sqrt{F}}{a\sqrt{2E'\bar{u}R_x}}$

The deformation ratio $A_r$ for two surfaces can be obtained by dividing their $A_d/A_i$ ratios, and using (11) one can write $$A_r = \frac{(A_d/A_i)_1}{(A_d/A_i)_2} = \frac{1 + 0.15(C/D_{q2}) + 0.015(C/D_{q2})^2}{1 + 0.15(C/D_{q1}) + 0.015(C/D_{q1})^2} \quad (12)$$

This expression gives information on how much more elastic deformation and "improved" surface can give as a function of $D_q$ in comparison to another one.

Figure 7:
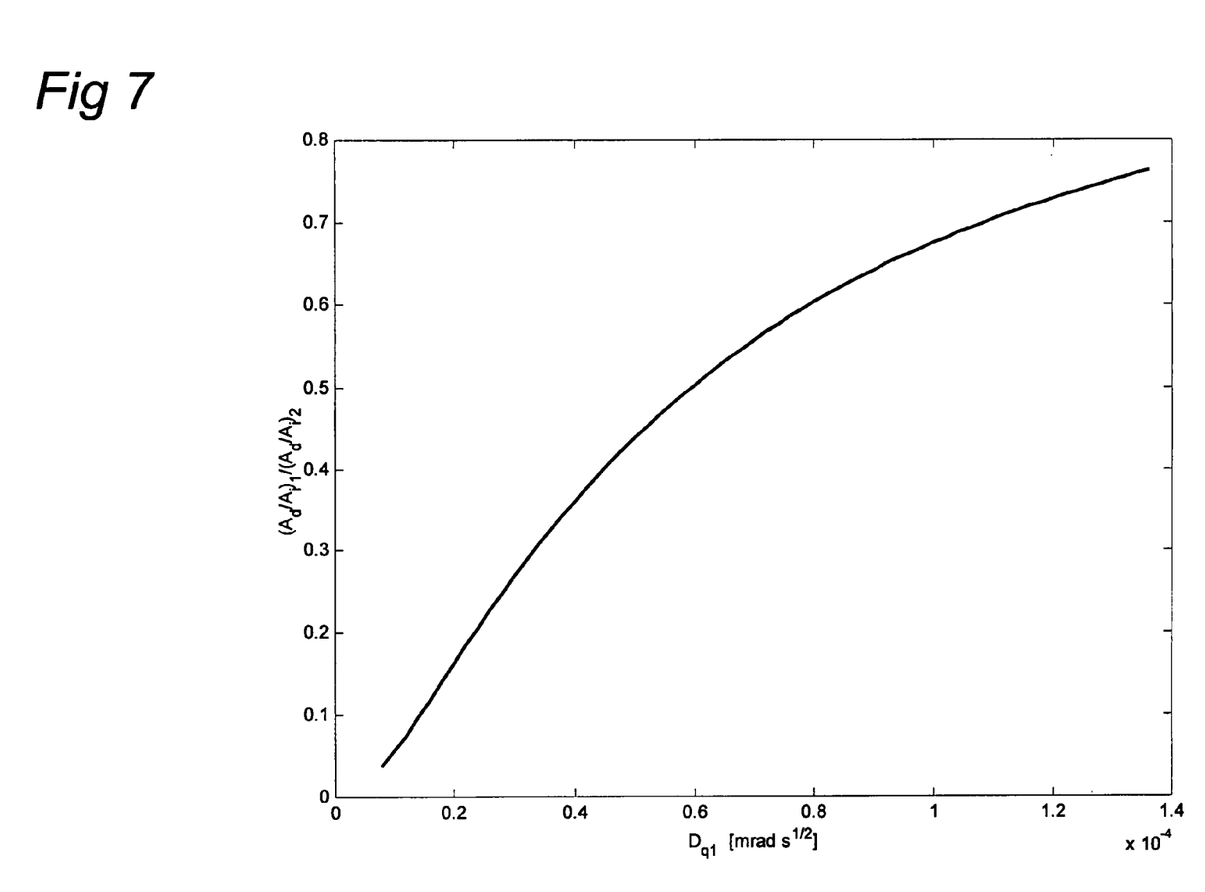
FIG. 7 shows a graph related to the elastic deformation ratio of two surfaces as a function of $D_q$ for an ULVF.

FIG. 7 shows a plot of equation (12) for a fixed value of $D_{q2}$=6.75×10$^{-4}$ mrad s$^{1/2}$, while $D_{q1}$ was varied to cover the claimed range $8.0 \times 10^{-6}$ mrad s$^{1/2} \leq D_{q1} \leq 1.36 \times 10^{-4}$ mrad s$^{1/2}$, the constant has also been fixed to the value of the all-steel bearing of the example C=3×10$^{-4}$ mrad s$^{1/2}$. From equation (12) one can see that $(A_d/A_i)_1 = A_r (A_d/A_i)_2$, and always $A_r < 1$.

The previous section refers to pure rolling, where equations (1) and (2) are valid. When sliding is present in the contact, a more complex situation arises since pressures and roughness change with time. However, the same basic principles of low slopes related to high elastic deformation apply.

Consider the case of pure sliding, the elastic deformation of the roughness is governed by different principles, however, reducing the slopes also leads to more elastic deformation.

Figure 8:
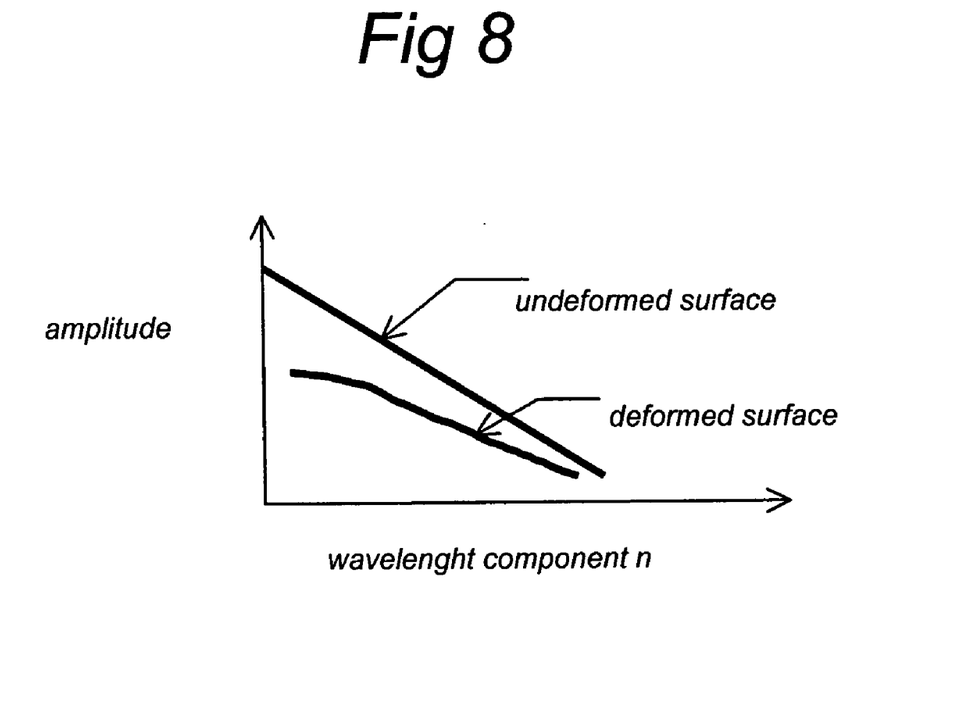
FIG. 8 shows a graph related to the amplitude reduction in pure sliding.

FIG. 8 shows a schematic reduction of the amplitude of the sinusoidal components in real roughness as a function of the wavelength number "n". Longer wavelengths deform more than short.

Long wavelengths in the surface topography also reduce the pressure ripple amplitude leading to lower subsurface stresses and therefore longer life.

$$p_{max} = \frac{3}{2H_o(1+H_o)(1+2H_o)} \quad (13)$$

Figure 9:
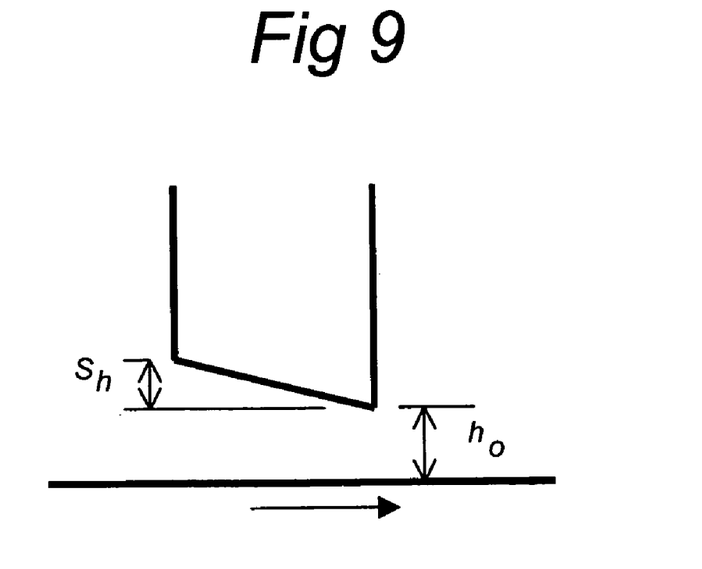
FIG. 9 shows the principle of a hydrodynamic wedge.

From FIG. 9 it is clear that $H_o = h_o/s_h$. Small values of $s_h$ produce large values of $H_o$ and this makes $p_{max}$ small.

The invention claimed is:

1. Rolling element bearing, comprising an inner ring, an outer ring and a series of rolling elements which are in contact with the raceways of said rings, an ultra-low viscosity fluid being present in said contacts having a kinematic viscosity $v=(\eta_o/\rho)$ of less than 2 mm$^2$/s, wherein the surfaces of the rings and the rolling elements have asperities which can have solid-to-solid contact during operation of the bearing, characterised in that a factor $D_q$ is defined which is equal to $$\Delta_q \sqrt{\eta_o} \alpha$$

wherein $\Delta_q$=mean slope of the roughness,
$\eta_o$=dynamic viscosity at saturation conditions,
$\alpha$=pressure-viscosity coefficient,
and in that the solid-to-solid contact of the asperities is reduced by selecting such design parameters and operating conditions of the bearing that $D_q$ is in the range from $8.0 \times 10^{-6}$ mrad s$^{1/2}$ to $1.36 \times 10^{-4}$ mrad s$^{1/2}$.

2. Bearing according to claim 1, wherein the surfaces of the rings and/or of the rolling elements are coated with a diamond like coating (DLC).

3. Bearing according to claim 1, wherein the surfaces of the rings and/or of the rolling elements are coated with an anti-corrosion material.

4. Bearing according to claim 3, wherein the anti-corrosion material is zinc.

5. Bearing according to claim 3, wherein the anti-corrosion material is stainless steel.

6. Bearing according to claim 1, wherein at least one of the rings and rolling elements have at least a ceramic rolling surface layer.

7. Bearing according to claim 1, wherein all rolling elements are of a ceramic material.

8. Bearing according to claim 1, wherein the rolling elements are separated by a cage of a high temperature resistant material.

9. Bearing according to claim 1, wherein the rings and rolling elements having a standard roughness $R_q$ of maximally 0.1 μm.

10. Bearing according to claim 1, wherein the rolling elements are separated by a cage of a high temperature resistant material comprising one of a polymer and a metal.

11. Bearing according to claim 10, wherein the high temperature resistant material comprises brass.

* * * * *